United States Patent [19]

Horn et al.

[11] Patent Number: 4,685,344

[45] Date of Patent: Aug. 11, 1987

[54] HELICAL BALL GEARING

[75] Inventors: Manfred Horn; Franz Mayer, both of Kaufungen, Fed. Rep. of Germany

[73] Assignee: Gebr. Bode & Co. GmbH, Kassel, Fed. Rep. of Germany

[21] Appl. No.: 772,729

[22] Filed: Sep. 4, 1985

[30] Foreign Application Priority Data

Sep. 12, 1984 [DE] Fed. Rep. of Germany ....... 3433394
Dec. 4, 1984 [DE] Fed. Rep. of Germany ....... 3444134

[51] Int. Cl.⁴ .............................................. F16H 25/22
[52] U.S. Cl. ........................ 74/424.8 NA; 74/424.8 R; 74/89.15
[58] Field of Search ................ 74/424.8 NA, 424.8 R, 74/424.8 VA, 458, 89.15

[56] References Cited

U.S. PATENT DOCUMENTS 2,076,180 4/1937 Griswold ............................. 74/459
4,343,200 8/1982 Alworth et al. ............... 74/424.8 R

FOREIGN PATENT DOCUMENTS 700304 12/1964 Canada .......................... 74/424.8 R
1128714 4/1962 Fed. Rep. of Germany ..... 74/424.8 R
1777001 12/1970 Fed. Rep. of Germany ..... 74/424.8 R
3323347 6/1983 Fed. Rep. of Germany ..... 74/424.8 R
120366 9/1979 Japan .......................... 74/424.8 NA
720148 3/1980 U.S.S.R. ......................... 74/424.8 R Primary Examiner—Rodney H. Bonck
Assistant Examiner—David A. Testardi
Attorney, Agent, or Firm—Collard, Roe & Galgano

[57] ABSTRACT

A helical ball gearing for converting axial or linear motion into rotary motion and vice versa. In a helical ball gearing including a rotor having at least one helical groove, a non-rotatable but axial displaceable shaft having at least one helical groove and being disposed at least partly within the rotor, a plurality of balls disposed in the helical grooves between the rotor and shaft, and a guide for the balls serving as a bearing for the balls, the guide being elastically resilient in the axial direction. The guide thereby allowing the balls to shift axially within the grooves so as to reduce wear on the grooves. The guide may be a helical spring.

5 Claims, 2 Drawing Figures

HELICAL BALL GEARING

BACKGROUND OF THE INVENTION

This invention relates to an apparatus for converting linear motion into rotary motion, and vice versa. More particularly, it relates to a helical ball gearing for translating axial or linear motion into rotary motion and vice versa, for use in mechanical components and machinery.

As is known in the art, a helical ball gearing for converting axial motion to rotary motion of a machine component, e.g. a rotary pillar or support for driving swivelling vehicle doors, has a non-rotatable piston rod, which is axially displaceable, for example with the help of a pneumatic drive, and which is locked against rotation, e.g. by keyways. When the piston rod is linearly displaced in the axial direction, a rotor performs a corresponding rotary motion, because of balls disposed in helical grooves of the rotor and piston rod. In existing devices of this kind, the balls are supported with the help of a ball cage, which is basically a sleeve having bores corresponding to and accommodating the balls.

For reliable operation of this type of ball gearing, the bores provided in the ball cage for guiding the balls must have exactly the same lead and pitch as the helical grooves of the rotor. Even minor deviations cause distortions impairing the smooth rolling of the balls in the helical grooves.

Furthermore, the ball cage may slightly change its position. Changes in position can be attributed to an irregular non-positive lock in the gearing and the effect of the force of gravity acting on the balls or the ball cage. As a result, before the rotor reaches its end position, the ball cage may run up against an obstacle. In this case the helical ball drive would then be more of a sliding helical drive, as the balls could no longer spin freely.

The problems arising from a change in position of the ball cage are increased when the ball gearing is operating in a vertical position. In this case, due to the force of gravity, the balls and the ball cage are subjected to strong impulses, e.g., jarring forces, in the direction of movement of the piston rod, e.g., during starting and stopping. Therefore, the proper and reliable operation of the known ball gearing device previously described cannot be assured.

Special problems are encountered with swivelling doors, e.g. on vehicles, which are driven by rotary pillars or supports. The rotary motion of the rotary pillars or supports is often produced via a ball gearing device, particularly when such rotary pillars or supports must operate for long periods. It has been found that the force required for the opening and closing movement can be transmitted into the rotor without the swivelling door showing any tendency to jam. However, if the door has to be opened by hand, in which case the resulting force acts on the rotor, a substantial amount of force has to be applied to open the door. The force required to open the door, in this case, will exceed the capability of some persons, e.g. passengers, thereby preventing them from opening the door.

Accordingly, it is an object of the present invention to provide a helical ball gearing for converting linear motion into rotary motion, having consistent and smooth operation, even after long periods of operation.

It is also an object of the present invention to provide a helical ball gearing having an improved means for guiding the balls, thereby allowing the helical ball gearing to operate reliably in any orientation.

SUMMARY OF THE INVENTION

Certain of the foregoing and related objects are readily attained in a helical ball gearing for converting axial motion into rotary motion and vice versa. The helical ball gearing includes a rotor having at least one helical groove and a nonrotatably, but axially displaceable shaft also having at least one helical groove and being disposed at least partly within the rotor. A plurality of balls are disposed in the helical grooves between the rotor and shaft. A guide for the balls serves as a bearing for the balls. The guide is elastically resilient in the axial direction, thereby allowing the balls to shift axially within the grooves, so as to reduce wear on the grooves. In a preferred embodiment of the invention, the guide is a helical spring, with the direction of spiral of the helical spring being opposite to that of the helical grooves. Due to the fact that the guide for the balls is designed as an elastically-flexible bearing for the balls, the tendency to jam is avoided, even after the parts of the helical ball gearing which become worn out with use, begin to show a certain amount of wear.

Preferably, the guide is supported by a spring element. If the helical ball gearing is operating in a vertical position, the spring element supporting the guide is preferably a helical spring.

With the helical ball gearing in a horizontal operating position, the guide is most desirably disposed between two spring elements. Preferably, the spring elements are helical springs, whereby the helical springs support the guide, and are secured in the rotor.

Other objects and features of the present invention will become apparent from the following detailed description when taken in connection with the accompanying drawings which disclose but a single embodiment of the invention. It is to be understood that the drawings are designed for the purpose of illustration only and are not intended as a definition of the limits of the invention.

BRIEF DESCRIPTION OF THE DRAWINGS

In the drawings wherein similar characters denote similar elements throughout the several views.

DETAILED DESCRIPTION OF THE PREFERRED EMBODIMENT

Figure 1:
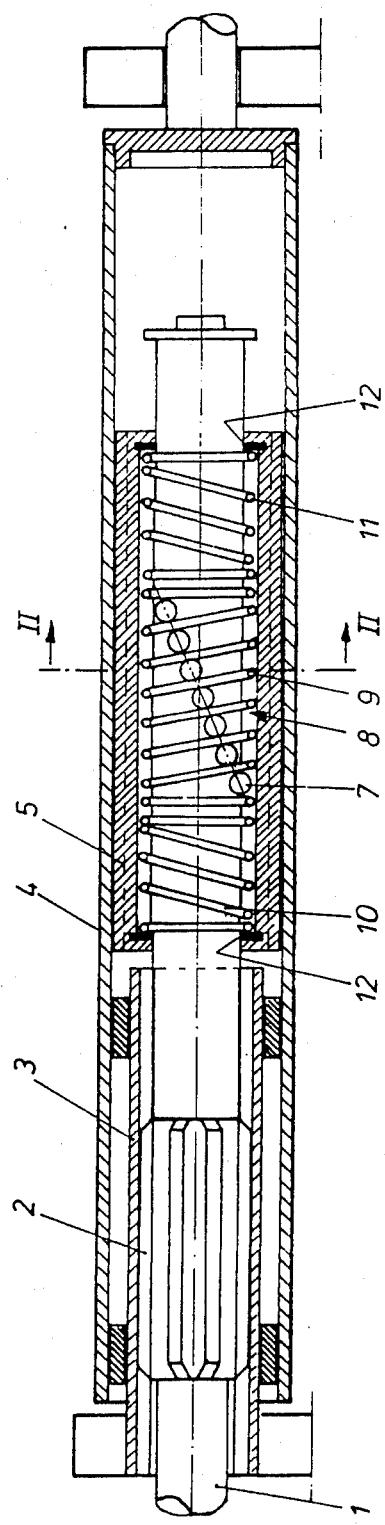
FIG. 1 is a longitudinal sectional view of the helical ball gearing according to the invention.

Turning now in detail to the appended drawings, therein illustrated is a novel helical ball gearing, embodying the present invention which includes a non-rotatable, but linearly or axially movable piston rod 1 having helical grooves 6. Piston rod 1 is prevented from turning by splined section 2 cooperating with a matchingly splined supporting or bearing sleeve 3. A rotor 5 is concentrically arranged with respect to piston rod 1. Rotor 5 is rigidly attached to tube 4, which may be a rotary pillar or support for a vehicle door.

Figure 2:
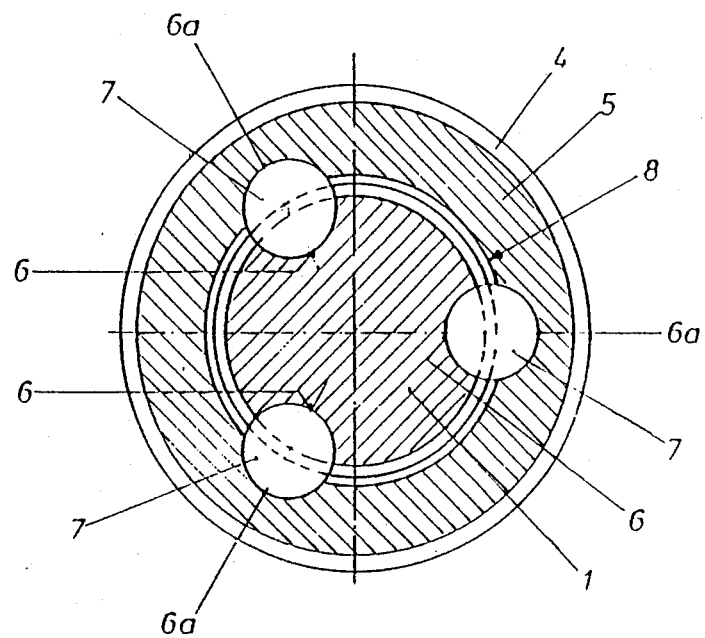
FIG. 2 is a sectional view taken along line II—II of FIG. 1.

Preferably, piston rod 1 has three helical grooves 6 (FIG. 2). Three corresponding helical grooves 6a are provided in rotor 5. Piston rod 1 and rotor 5 are kinematically connected with each other via balls 7, which are guided in a guide, generally designated by reference numeral 8, provided in the form of an elastically resilient bearing for the balls. Guide 8 is preferably a helical spring 9.

Due to the fact that the direction of spiral of spring 9 is the reverse of that of the grooves 6, (e.g., with the spiral of the spring running clockwise, and the spiral of the grooves running counterclockwise, as viewed from the same direction), balls 7 are prevented from rolling down in the helical groove along the guide. If the direction of spiral of helical grooves 6 and spring 9 were the same, there would be nothing to hold the balls in position.

The elastic support of spring 9 does not provide for exact positioning of the balls in the helical grooves 6. Due to the elastic nature of the support of spring 9, balls 7 vary their positions slightly. As a result, pitting in the helical grooves caused by the change in direction of the driving forces is prevented because the balls do not constantly remain in the same position.

As guide 8 is provided in the form of an elastically resilient and flexible bearing for the balls particularly in the form of a helical spring, deviations that may be present in the grooves with respect to, e.g. pitch or the like, cannot lead to any jamming, as any such flaws are compensated for by the spring.

Guide 8 is supported elastically. When the device is in a horizontal operating position, this elastic support is achieved by two coil springs 10 and 11, disposed on either side of guide 8. Springs 10 and 11 are secured in the rotor 5 at point 12, with guide 8 disposed therebetween. The center position of guide 8 is not exactly fixed, and it will be slightly shifted to the one side or the other. As a result, the balls will not always be in the same position, so that pitting in the helical grooves is largely prevented.

With a vertical operating position of the helical ball gearing, e.g. in rotary pillars or supports, one spring mounted underneath guide 8 is sufficient as an elastic support.

Thus, while only one embodiment of the present invention has been shown and described, it will be obvious that many changes and modifications may be made thereunto, without departing from the spirit and scope of the invention.

What is claimed is:

1. In a helical ball gearing for converting an axial motion into rotary motion and vice versa, of the type including a rotor having at least one helical groove, a non-rotatable, but axially displaceable shaft having at least one helical groove and being disposed at least partly within the rotor, a plurality of balls disposed in the helical grooves between the rotor and shaft, and a guide for the balls serving as a bearing for the balls, the improvement comprising:

said guide being a helical spring elastically resilient in the axial direction, said helical spring having a clockwise direction of spiral and said grooves having a counterclockwise direction of spiral as viewed from the same direction, thereby allowing the balls to shift axially within the grooves so as to reduce wear on the grooves.

2. In a helical ball gearing for converting an axial motion into rotary motion and vice versa, of the type including a rotor having at least one helical groove, a non-rotatable, but axially displaceable shaft having at least one helical groove and being disposed at least partly within the rotor, a plurality of balls disposed in the helical grooves between the rotor and shaft, and a guide for the balls serving as a bearing for the balls, the improvement comprising:

said guide being a helical spring elastically resilient in the axial direction, said helical spring having a counterclockwise direction of spiral and said grooves having a clockwise direction of spiral as viewed from the same direction, thereby allowing the balls to shift axially within the grooves so as to reduce wear on the grooves.

3. In a helical ball gearing for converting an axial motion into rotary motion and vice versa, of the type including a rotor having at least one helical groove, a non-rotatable, but axially displaceable shaft having at least one helical groove and being disposed at least partly within the rotor, a plurality of balls disposed in the helical grooves between the rotor and shaft, and a guide for the balls serving as a bearing for the balls, the improvement comprising:

said guide being elastically resilient in the axial direction, thereby allowing the balls to shift axially within the grooves so as to reduce wear on the grooves, and two springs disposed on opposite ends of said guide for operation in a horizontal position of the helical ball gearing so as to support said guide in position along the shaft.

4. The helical ball gearing as defined in claim 3, wherein said springs are helical springs.

5. The helical ball gearing as defined in claim 3, wherein said springs are secured into the rotor.

* * * * *